Patented Dec. 25, 1928.

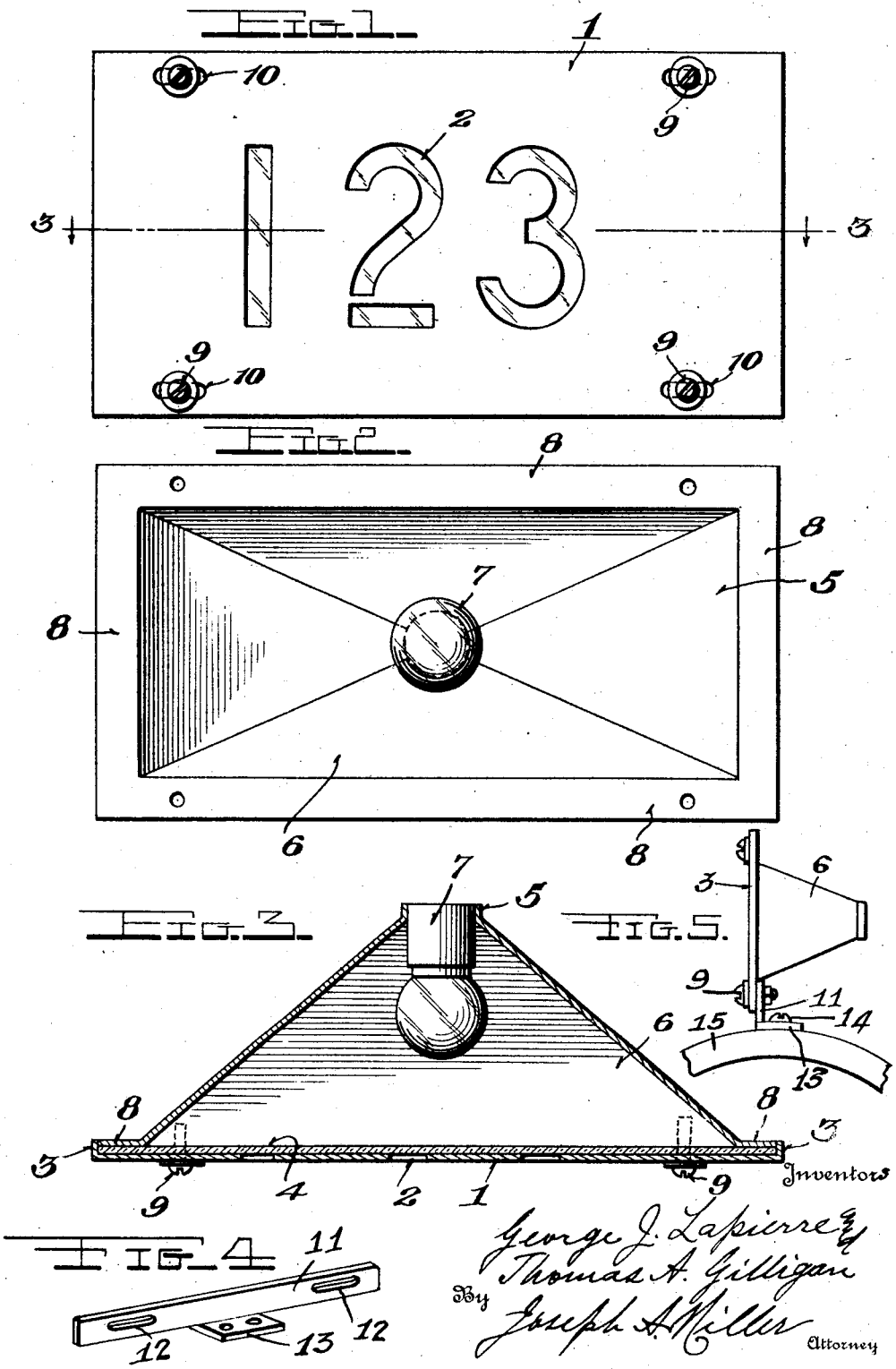

1,696,804

UNITED STATES PATENT OFFICE.

GEORGE J. LAPIERRE, OF PAWTUCKET, AND THOMAS A. GILLIGAN, OF PROVIDENCE, RHODE ISLAND; SAID GILLIGAN ASSIGNOR OF ONE-TWENTIETH TO ANNIE P. BONIN, OF PAWTUCKET, RHODE ISLAND, AND ONE-TENTH TO JULIAN C. MARX, OF PROVIDENCE, RHODE ISLAND, AND ONE-TWENTIETH TO LOUIS J. G. MARTELLE, LEO McKENNA, AND LEO V. BOYLE, ALL OF PAWTUCKET, RHODE ISLAND, AND ONE-TWENTIETH TO JOSEPH W. AND EMMA PLANTE, BOTH OF WOONSOCKET, RHODE ISLAND.

AUTOMOBILE LICENSE-PLATE HOLDER.

Application filed May 4, 1928. Serial No. 275,051.

This invention relates to automobile license plate holders, and the primary object of the invention is to provide an illuminated plate holder which is of simple, economical and compact construction, and one in which a minimum of parts are required.

A still further object of the invention is to provide a holder in which all of the parts are held together by means of fasteners, which latter also engage with the usual license holder or bracket common to automobiles In the drawings:—

Figure 1 is a front elevation of the invention,

Figure 2 is a similar view of the back member,

Figure 3 is a section on line 3—3 of Figure 1,

Fig. 4 is a perspective view of a holding bracket by means of which the invention may be secured to an automobile, and Fig. 5 is an end elevation of the invention secured to an automobile fender by means of said bracket.

In proceeding in accordance with the present invention a preferably metal plate 1 is employed which latter has indicia-forming slots therein, which slots form the license number of the automobile. The side and edges of the plate 1 are flanged rearwardly as indicated at 3 and are engaged by an inopaque member 4, the latter preferably being formed of celluloid and colored in accordance with the color adopted by the particular state in coloring their license tags. A back member 5 is employed which has a dished central portion 6, which latter is preferably of flared formation and at its rear end is provided with a source of light 7 which may be secured thereto in any desired manner. The front portion of the back is formed with outwardly extending flanges 8, which lie parallel to the members 1 and 4 and engage with the rear face of the member 4 and with the flanges 3 so that the parts are thus held in position. For the purpose of not only securing all of the three members together, but also for the purpose of attaching same as a unit to the usual bracket or license tag holder, 11, screws 9 are employed, preferably four in number which engage through apertures provided therefor in the members 1 and 4 and the flanges 8 and extend rearwardly of the flanges 8 so as to be engageable with the license tag bracket or holder of the automobile. In this manner it will be noted that the fasteners constitute unitary means for not only holding the three members of the invention together, but to also secure same as a unit to the automobile. If desired, as shown in Figure 1, the openings for the screws may be in the form of elongated slots 10 so as to enable the screws to be adjusted to engage the automobile tag holder or bracket.

Figs. 4 and 5 depict one form of bracket which may be employed in securing the invention onto an automobile wherein the same is of approximately the width of that of the bottom flange 8 and has slots 12 to receive screws 9. A lug 13 projects outwardly from the bracket and is perforated to receive screws or bolts 14, by means of which the bracket is secured to the fender 15. The bracket, however, forms no part of the present invention and the one shown is merely illustrative of one form thereof which may be employed.

Having thus described our invention what we claim as new and desire to secure by Letters Patent is:—

1. In an automobile license plate holder, a plate having its sides and ends flanged rearwardly and having indicia-forming cutouts, an inopaque member engaged with the rear of the plate and with said flanges so as to be held in position by the latter, a back member having a central dished portion and having outwardly directed flanges at its side and end edges disposed parallel to the plate and engaged with the inopaque member and with the plate flanges, a source of light at the center of the rear of the back member, and attaching screws extending through the said plate, through the inopaque member and through the flanges of the back member.

2. The combination with a support mounted on an automobile, of a back member comprising a casing provided at its front end with outwardly extending flanges, a source of light in said casing, a member provided with indicia forming cut-outs, an inopaque member arranged between the inopaque member and the source of light, and fastening means extending through said indicia bearing and inopaque members and through said flanges into said support.

In testimony whereof we have hereunto signed our names to this specification.

GEORGE J. LAPIERRE.
THOMAS A. GILLIGAN.